Oct. 21, 1924.
G. A. HAWKEN
GATE
Filed Nov. 5, 1923
1,512,089
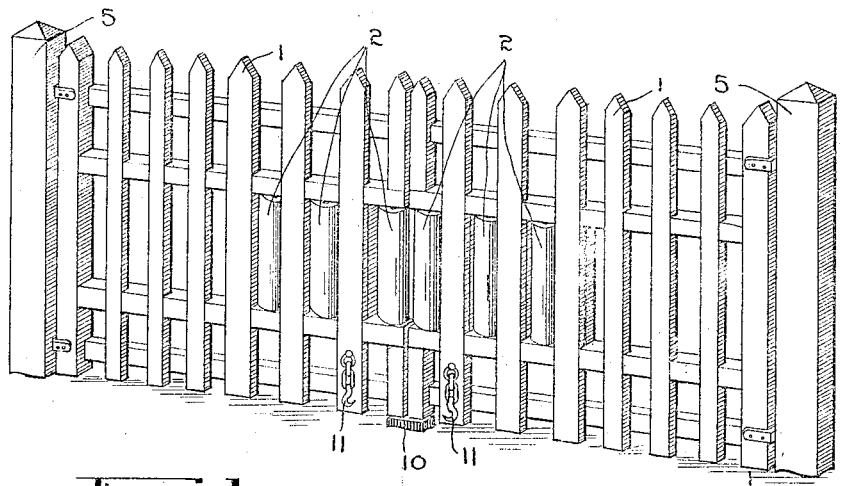
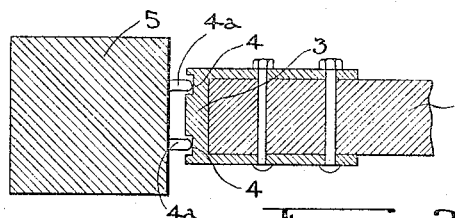
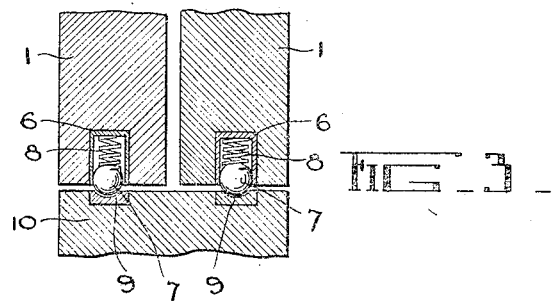
Inventor
G.A. Hawken
by Langner, Parry, Card & Langner
Attys.

Patented Oct. 21, 1924.

1,512,089

UNITED STATES PATENT OFFICE.

GLORIA AMELIA HAWKEN, OF WHANGAREI, AUCKLAND, NEW ZEALAND.

GATE.

Application filed November 5, 1923. Serial No. 673,001.

*To all whom it may concern:*

Be it known that I, GLORIA AMELIA HAWKEN, a citizen of the Dominion of New Zealand, residing at Maunu, Whangarei, in the Provincial District of Auckland, New Zealand, have invented certain new and useful Improvements in Gates, of which the following is a specification.

This invention relates to gates and the like, and has for its object, the provision of improvements, which will enable a gate or the like to be opened by a motor vehicle, without the necessity of anyone dismounting therefrom, said gate being also self-closing.

According to the invention the gate is provided with buffers in the form of vertical rollers, mounted so as to project from each side of the gate at a height from the ground, where they will come in contact with a vehicle, when the latter is driven into the gate.

The gate is hung so as to be capable of opening either way and is mounted by hinges which render it self-closing and besides is provided with a spring pressed check catch for preventing it from swinging idly and also with a chain and hook for securing it open when required.

The gate can be either single or double.

In the accompanying drawing in conjunction with which the invention will be further described:—

Figure 1 is a perspective view of a double gate fitted with the improvement.

Figure 2 is a sectional plan view, illustrating a lower hinge, and

Figure 3 shows the check catch.

In the case of a double gate as shown in Figure 1 each half 1 of the gate has mounted thereon a number of vertical rollers 2 which project from each side of the gate. The rollers 2 extend from the free or meeting vertical edges of the gate halves 1 to approximately half way to the hinged edges, and are situated at a suitable height from the ground, so that a vehicle on being driven into the gate, will come in contact with said rollers.

Each gate half 1 is hung by means of the well known form of hinges comprising an upper central pivot and a lower horizontal plate 3, with recesses 4 therein, attached to a gate half 1 and working against a pair of projections 4ª from a gate post 5. This manner of hinging gate provides for the halves thereof being thrown out of plumb or being canted when opened to either side, the gate coming to its closed position when released.

In order to prevent the halves of the gate from swinging about idly, each of the free or vertical meeting edges of the halves 1 has fitted in the lower end thereof a casing 6 from which a ball 7 is caused to project by a spring 8.

The ball catches 7 engage in recesses 9 in a stop 10 inserted in the ground, when the halves of the gate are in the closed position, and prevent the gate from swinging idly about, but are not strong enough to prevent the gate from being opened by the pressure of a vehicle.

The halves 1 are each provided with chains and hooks 11, in order that the gate can be secured open, when required.

A vehicle in order to pass through the gateway is driven slowly into the closed gate, which is forced open, the vehicle passing between the two halves 1, the roller buffers 2 of which make contact with the front and sides of the vehicle as the latter forces open and passes between the two halves.

Immediately the vehicle is clear of the halves 1 the latter owing to their manner of being hinged return to the closed position.

A single gate is hung and mounted in a manner similar to a half 1, but is provided with more rollers 2 than the latter.

The rollers 2 are made to turn freely on their spindles, so as to minimize friction between the gate and the vehicle. Also said rollers can be wood, rubber or be covered with soft material to prevent injury to the vehicle.

What I do claim and desire to obtain by Letters Patent of the United States of America is:—

1. A gate, at least one vertical roller mounted on the gate, projecting from each side of the gate, and so located as to make contact with a vehicle driven into the gate.

2. A gate, at least one vertical roller mounted on the gate, projecting from each side of the gate, and so located as to make contact with a vehicle driven into the gate, a spring pressed catch projecting from the gate at its lower end, a stop secured adjacent the gate and a recess in the stop to receive the catch.

3. A gate post, a gate swingingly hinged to the post, and at least one vertical roller pivoted to the gate in the plane of the gate, projecting to either side of the gate, and swinging bodily with the gate.

Signed at Whangarei, in the Dominion of New Zealand, this 22nd day of September, A. D. 1923.

GLORIA AMELIA HAWKEN.

Witnesses:
JAMES FREDERICK SHEET BRIGGS,
F. A. BRIGGS,
BERKELEY PHELPS HOPKINS.